(12) United States Patent
Benvenisti et al.

(10) Patent No.: US 12,431,606 B2
(45) Date of Patent: Sep. 30, 2025

(54) AIR-BREATHING PLATFORM-MOUNTED SATCOM RADOME

(71) Applicant: SatixFy UK Limited, Farnborough (GB)

(72) Inventors: Leon Benvenisti, Farnborough (GB); Moshe Medina, Farnborough (GB); Yuval Yassour, Farnborough (GB)

(73) Assignee: SatixFy UK Limited, Farnborough (GB)

( * ) Notice: Subject to any disclaimer, the term of this patent is extended or adjusted under 35 U.S.C. 154(b) by 165 days.

(21) Appl. No.: 18/154,905

(22) Filed: Jan. 16, 2023

(65) Prior Publication Data
US 2023/0178872 A1 Jun. 8, 2023

Related U.S. Application Data

(63) Continuation of application No. PCT/EP2021/069670, filed on Jul. 14, 2021.
(Continued)

(51) Int. Cl.
*H01Q 1/02* (2006.01)
*H01Q 1/27* (2006.01)
(Continued)

(52) U.S. Cl.
CPC .......... *H01Q 1/02* (2013.01); *H01Q 1/27* (2013.01); *H01Q 1/28* (2013.01); *H01Q 1/32* (2013.01); *H01Q 1/42* (2013.01); *H01Q 21/00* (2013.01)

(58) Field of Classification Search
CPC .. H01Q 1/02; H01Q 1/28; H01Q 1/32; H01Q 21/00; H01Q 1/27; H01Q 1/42;
(Continued)

(56) References Cited

U.S. PATENT DOCUMENTS

| 4,905,937 A | 3/1990 | Spotswood | |
|---|---|---|---|
| 2014/0139400 A1* | 5/2014 | Voss | H01Q 1/02 343/904 |

(Continued)

FOREIGN PATENT DOCUMENTS

| CN | 108767472 A | 11/2018 | |
|---|---|---|---|
| CN | 110401001 A * | 11/2019 | H01Q 1/02 |

(Continued)

OTHER PUBLICATIONS

International Search Report and Written Opinion for PCT Application No. PCT/EP2021/069670, mailed Nov. 4, 2021.

*Primary Examiner* — Dameon E Levi
*Assistant Examiner* — Yonchan J Kim
(74) *Attorney, Agent, or Firm* — PEARL COHEN ZEDEK LATZER BARATZ LLP

(57) ABSTRACT

A platform-mounted radome which includes: a low-profile aerodynamic canopy made of a radio frequency (RF) transparent material, wherein the canopy has a leading edge and a trailing edge and is suitable to accommodate a flat panel satellite communication (SATCOM) antenna; an air-cooling duct connecting an inlet at the leading edge of the canopy and an outlet at the trailing edge of the canopy, wherein the air-cooling duct is designed to transfer cool air collected by the inlet across the canopy when flying; and wherein heat is transferred between the thermally coupled heat-generating elements of the SATCOM antenna and the air-cooling duct; and one or more heat sinks located within the air-cooling duct and thermally coupled thereto.

10 Claims, 13 Drawing Sheets

Related U.S. Application Data

(60) Provisional application No. 63/051,409, filed on Jul. 14, 2020.

(51) Int. Cl.
*H01Q 1/28* (2006.01)
*H01Q 1/32* (2006.01)
*H01Q 1/42* (2006.01)
*H01Q 21/00* (2006.01)

(58) Field of Classification Search
CPC ........ B64C 1/36; B64C 7/02; H05K 7/20163; H05K 7/20918
USPC ................................ 361/697, 709–710, 704
See application file for complete search history.

(56) References Cited

U.S. PATENT DOCUMENTS

| | | | |
|---|---|---|---|
| 2018/0018004 A1* | 1/2018 | Isereau | ................... G06F 1/206 |
| 2019/0390601 A1* | 12/2019 | Casado-Montero | ... B64D 33/02 |

FOREIGN PATENT DOCUMENTS

| | | | |
|---|---|---|---|
| JP | 2003110330 A | 4/2003 | |
| JP | 2013131860 A | 7/2013 | |
| WO | WO-2022/013322 | 1/2022 | |

* cited by examiner

Standard Half-Body (Solid) Radome

Air-Breathing Radome – Type 1A

Air-Breathing Radome – Type 1B

Air-Breathing Radome – Type-2

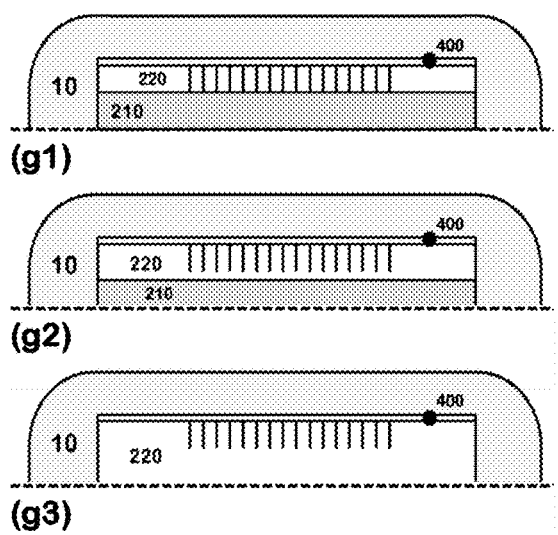
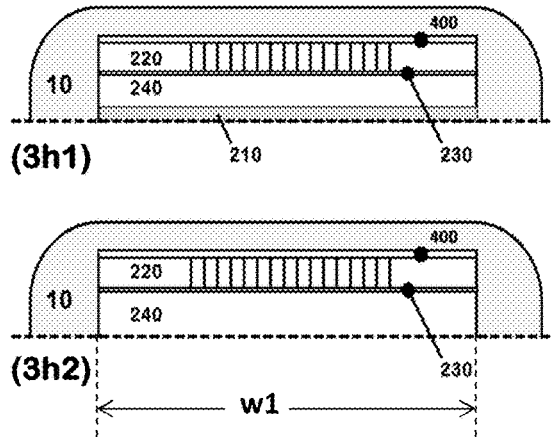
Fig – 03g
Fig – 03h
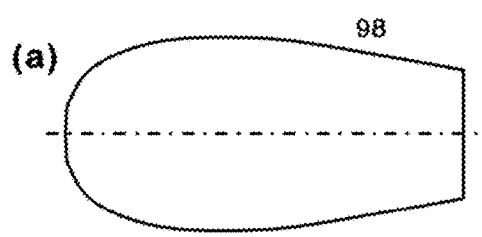
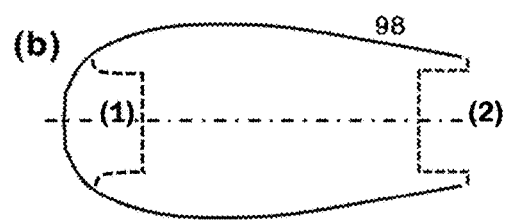
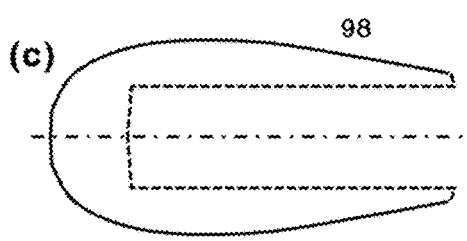
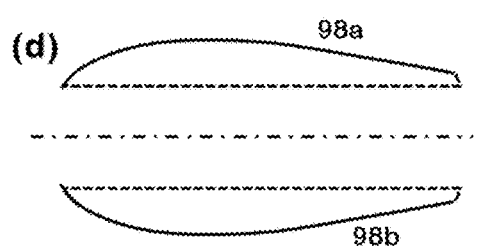
Fig – 03i

PM-ABR : Type 1A - Multi-Channels ACD

Split InlEt / outlEt

CEntrAl InlEt / outlEt

PM-ABR - Type-1A

PM-ABR - Type-1B

PM-ABR - Type-2

PM-ABR Type-1

PM-ABR Type-2

PM-ABR Type-1B

PM-ABR Type-2

PM-ABR T1+T2A

PM-ABR-T2B

AIR-BREATHING PLATFORM-MOUNTED SATCOM RADOME

CROSS-REFERENCE TO RELATED APPLICATION

This Application is a continuation of PCT Application No. PCT/EP2021/069670, filed on Jul. 14, 2021, which claims the benefit of and priority to U.S. Provisional Patent Application No. 63/051,409, filed on Jul. 14, 2020, both are incorporated herein by reference in their entirety.

FIELD OF THE INVENTION

The present invention relates generally to the field of heat dissipation mechanisms, and more particularly to such mechanisms directed to dissipate heat from a platform-mounted radome.

BACKGROUND OF THE INVENTION

Heat dissipation in an active antenna radome (radar dome) is a known challenge. The active antenna produces a lot of heat and since it is covered with a radome, there is a need to dissipate the heat outside of the radome quickly. Many solutions involve moving parts which over-complicate the mechanism and make them prone to failure, are energy inefficient and usually heavy weight. For platform-mounted antenna radome such as satellite communication (SATCOM) radome mounted on aerial vehicles, ground vehicles, marine vehicles or any kind of moving platforms, the need for a low weight and low-profile aerodynamic footprint provides further challenges.

BRIEF SUMMARY OF THE INVENTION

Some embodiments of the present invention address the aforementioned challenges and provide a platform-mounted radome which includes: a low-profile aerodynamic canopy made of a radio frequency (RF) transparent material, wherein the canopy has a leading edge and a trailing edge and is suitable to accommodate a flat panel satellite communication (SATCOM) antenna; an air-cooling duct connecting an inlet at the leading edge of the canopy and an outlet at the trailing edge of the canopy, wherein the air-cooling duct is designed to transfer naturally cool air collected by the inlet across the canopy when the platform is moving; means for transferring heat thermally coupled to heat-generating elements of the SATCOM antenna and the air-cooling duct; and one or more heat sinks located within the air-cooling duct and thermally coupled thereto.

Additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIGS. 01$b$ to 01$e$ show an aerodynamically shaped streamlined radome mountable on a moving platform in accordance with some embodiments of the present invention;

DETAILED DESCRIPTION OF THE INVENTION

Figures 1, 1A:
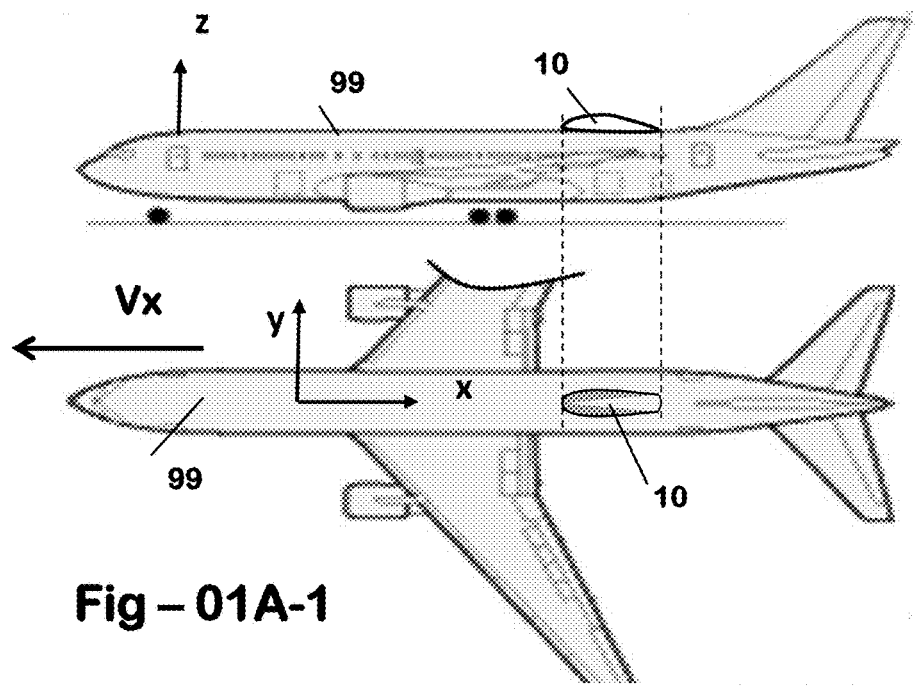
FIGS. 01$a$1 to 01$a$4 show an aerodynamically shaped streamlined radome mountable on a moving platform (aircraft, car, boa, train) in accordance with some embodiments of the present invention.
Figures 1, 1A, 2:
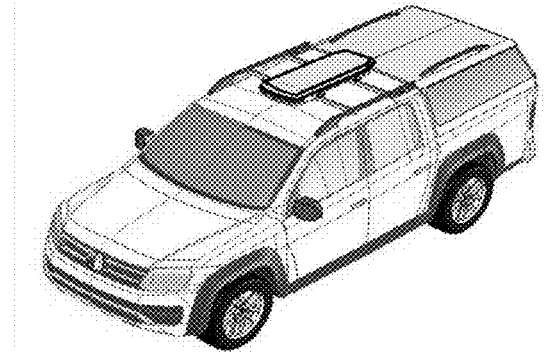
FIGS. 02$a$ to 02$c$ show graph diagrams illustrating aerodynamic aspects in accordance with some embodiments of the present invention.

With specific reference now to the drawings in detail, it is stressed that the particulars shown are for the purpose of example and solely for discussing the preferred embodiments of the present invention and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Reference in this application to airplanes is by way of example only and the Air-Breathing Radome discussed herein in accordance with some embodiments of the present invention can easily be mounted on other moving platforms such as cars, ground vehicles, ships and other marine vehicles and other aerial vehicles.

Various aerodynamic (AD) configurations of platform-mounted (PM) Air-Breathing Radome (ABR) are disclosed in this application. PM-ABR is a straightforward acronym of the unique Platform-Mounted Air-Breathing Radome associated with the present invention.

FIGS. 01$a$1-01$a$4 show an aerodynamically shaped streamlined radome mountable on a moving platform (aircraft, car, boat, train) in accordance with some embodiments of the present invention.

For example, in airborne applications (see FIG. 01a-1), a standard smooth and solid, aerodynamically shaped streamlined radome (10) is frequently mounted above the rear side of a passenger airplane fuselage (99), close to its tail. In most applications of the PM-ABR of the present invention, it is mounted in a similar way.

The PM-ABR is specifically designed and configured for the following purposes:

Hosting various types of SATCOM antennas, i.e., hosting at least one multi-channel Flat-Panel-Antenna (FPA). In particular, it is designed to host the state-of-the-art FPA defined as Electrically Steered Multi Beam Array. Most PM SATCOM radome set-ups include one Receive Antenna (R-An) and one Transmit Antenna (T-An), providing "NATURAL "Heat Removal Mechanism" (HRM)" without moving parts, nor use of any source of energy, by using the incoming cold-air as a coolant during platform movement. HRM is a necessity for temperature-management of the SATCOM (heat-generated) antennas. Providing Natural HRM is a main objective of the present invention. Yet another main objective of the present invention is to minimize aerodynamic drag. Accordingly, the various AD-configurations of PM-ABR of the present invention are characterized by AD-smoothed, low-profile streamlined AD-geometries.

Another important goal is to obtain optimal and efficient HRM as well as low drag, where in practice many system/mounting requirements should be taken into account.

Also, the PM-ABR is associated, in this application, with SATCOM equipment, the present invention, in general (without derogating the generality), can be applied for any other AB-application where natural HRM and/or low drag is relevant.

The meaning of optimized AD-configuration, with respect to the PM-ABR of the present invention, is multiple:

(a) To optimize the External Flow Regime (EFR) around the PM-ABR (i.e. mainly to minimize drag, but also other aero-mechanical issues should be considered), where Boundary-Layer (BL) separation, wake-flow and appearance of Shock-Wave (SW) may severely increase drag (to mention just a few of many such harmful AD-phenomenon).

(b) To optimize (i.e. with respect to the heat removal requirements) the Internal Flow Regime (IFR) where cold-air is channeled through the PM-ABR, from its inlet at the Leading Edge (LE) of PM-ABR, to its outlet at the Trailing Edge (TE) of the PM-ABR. The inner channel where cold air is passing it from LE to TE, will be referred to hereafter as the "Air-Cooling Duct" (ACD), associated with the present invention.

(c) To optimize the PM-ABR configuration, where (a) and (b) are aerodynamically coupled. To limit the harmful effects of such interactions, decoupling concepts are included in this disclosure, to be presented hereafter.

(d) To optimize a practical AD-configuration of a specific PM-ABR, where system and installation requirements, constrains and limitations, should be taken into account.

The cooled air is flowing through the ACD, where the upper-wall of the ACD is thermally connected to the heat-spreader (HSP) plate made of thermal-conductive materials such as Aluminum (AL).

In the case that the moving platform is an airplane, the "Natural" HRM should be effective during flight from Takeoff, to Landing, and in particular must be AD and Thermo-Dynamically (TD) optimized at cruise-conditions, where a typical passenger airplane is crossing oceans and continents (most of fight duration) at high altitude (30-40,000 Ft), and at transonic cruise speed of M=0.75-0.85.

At such transonic cruise-conditions, i.e., close to "Critical Mach Number" (MCR), the AD-optimization (of both the EFR and the IFR) should take into account highly compressible turbulent flow characteristics including BL effects, transonic typical phenomenon: SW, interaction between SW and BL, sonic-boom, sonic-barrier (drag rapidly increasing with M (Mach-Number), as-well as AD (skin) heating.

Figure 2A:
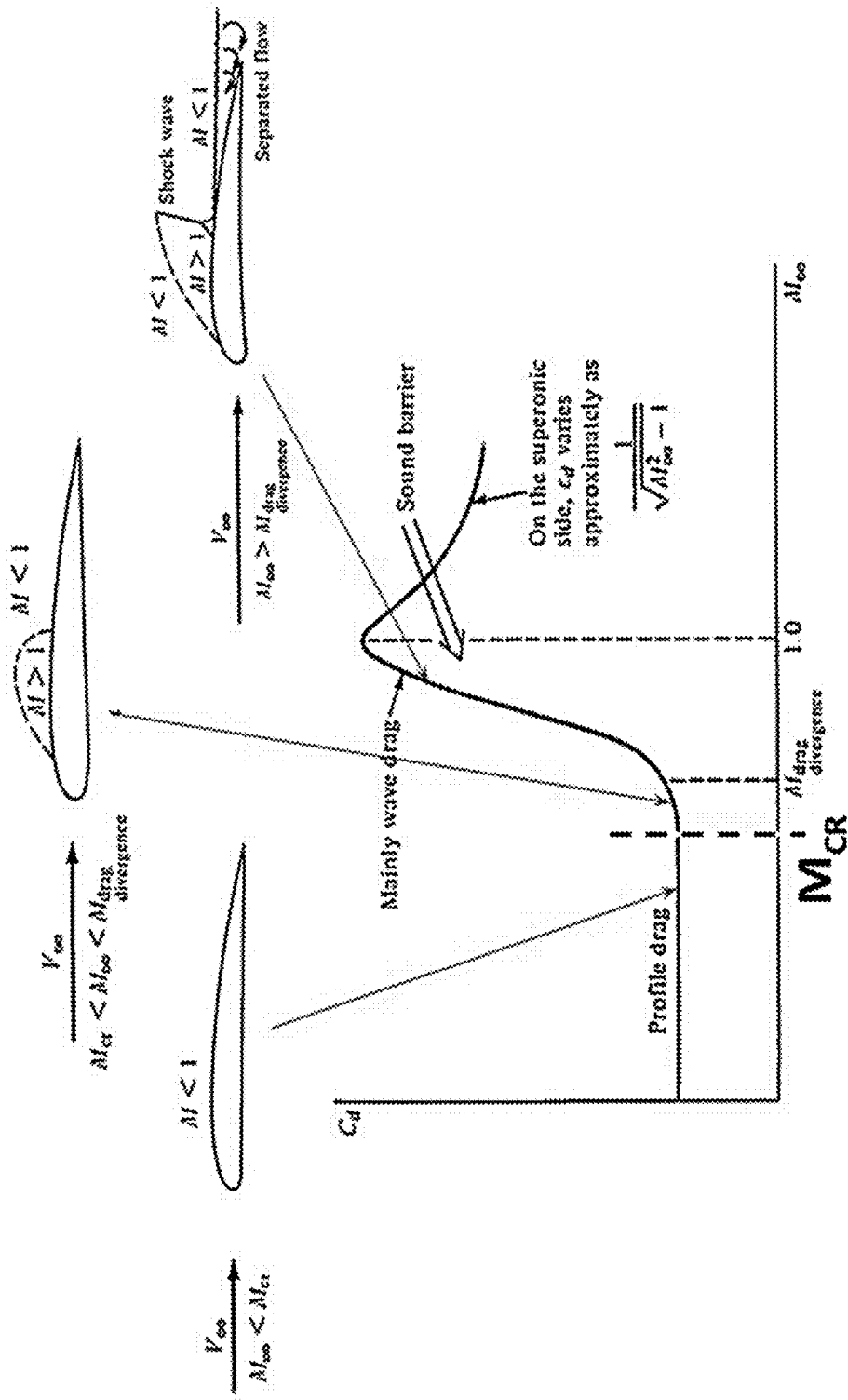

In highly compressible transonic speed of flight, (i.e. M close to MCR), drag is very sensitive to any design detail of the AD-configuration. FIG. 02a shows 3 different EFRs of drag at speed flight close to M=1. In in particular, the graph shows the rapid drag increase when approaching M=1 ("sonic-barrier"), where "waves-drag" is dominant.

Figure 2B:
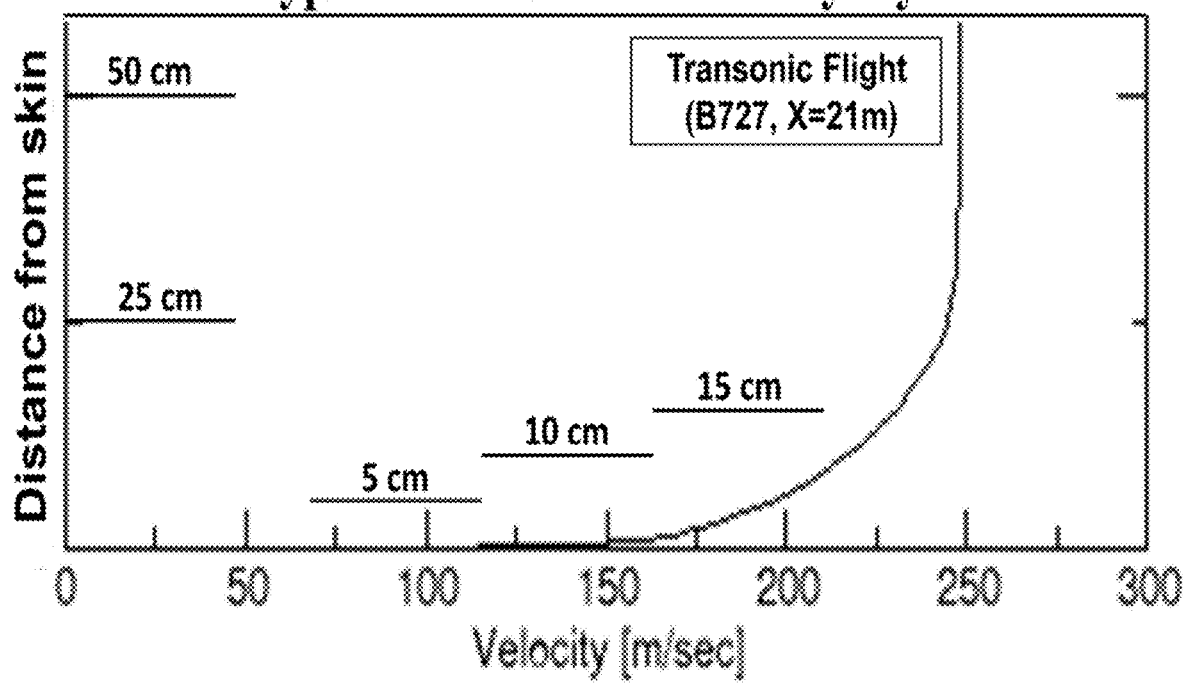

Typically, the PM-ABR is mounted on the rear side of an airplane fuselage (see FIG. 01a-1). Accordingly, the flow field that attacks the LE of the PM-ABR (i.e. being of a thin, streamlined, slender AD-configuration) is a compressible, turbulent BL that is developed over the airplane from its nose (I.e. downstream). A (universal) dimensional velocity-profile of such BL is shown in FIG. 02b, manifests rapid growth of the BL up-wise (+z), thus a weak sub-layer characterized by large shear-flow exists close to fuselage skin.

AD-optimization of the unique PM-ABR of the present invention means to optimize AD-configuration of the PM-ABR under such attacking flow field.

Figure 2C:
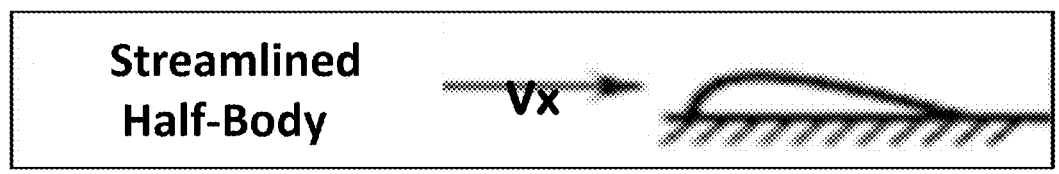

FIG. 02c classified by meaningful common (i.e. in literature) name to the AD-configuration (i.e. 3D) of the PM-ABR of the present invention: a "Streamlined Half Body"

Without derogating the generality, the PM-ABR of the present invention can be mounted on any relevant civil or military platforms moving in a cruise speed (at any Mach number, including of course near to MCR). In case of airplanes, it is relevant for small and moderate size business-aircrafts such as the Gulfstream family, but in particular it is designed to be mounted on "narrow-body" passenger aircrafts such as Boeing 737 and Airbus 320 families and for "wide-body" passenger aircrafts such as the Airbus A330, A340, A350 and the Boeing 767,777,787,797 families.

Figures 1, 1A, 2, 3:
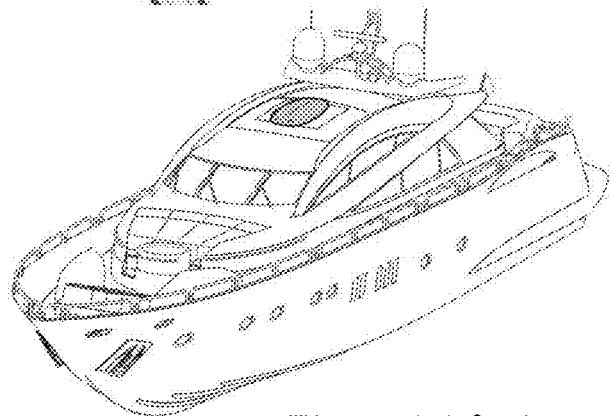
FIGS. 03$a$-03$j$ show several radome shape diagrams illustrating aspects in accordance with some embodiments of the present invention.
Figures 1, 1A, 2, 3, 4:
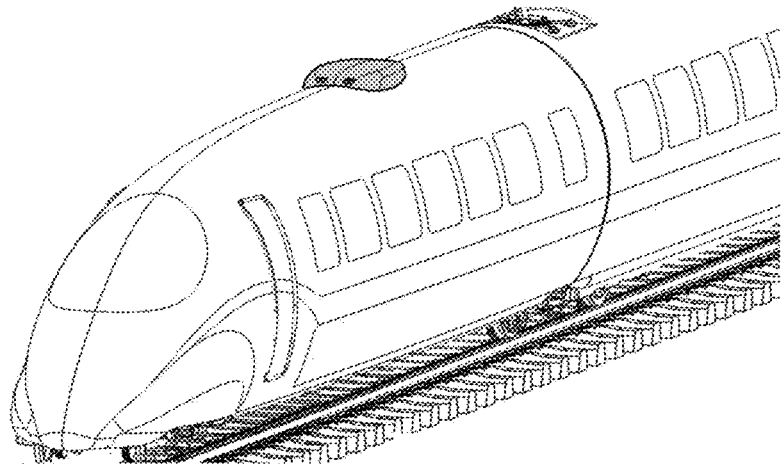
FIGS. 04$a$ to 04$d$ show mechanical diagrams illustrating aspects in accordance with some embodiments of the present invention.
Figure 1B:
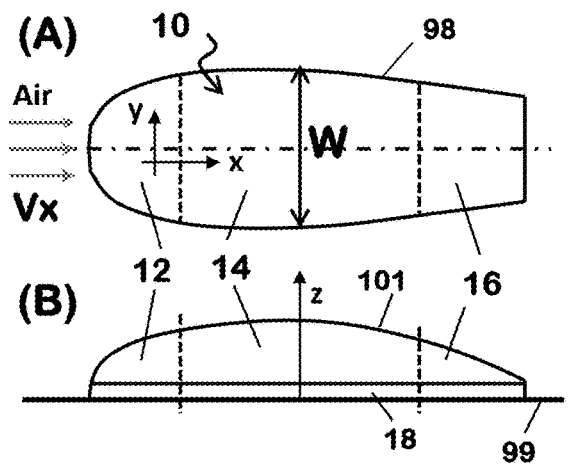

A generalized view of a typical AD-configuration (10) associated with the present invention is shown in FIG. 01b (top-view a, and side-view b).

The PM-ABR (10) may conceptually be divided into 4 sections:

The Inlet-Section (12), where the entrance of cold-air (i.e. to allow "air-breathing") of the ACD is created at the LE of the PM-ABR that is facing the high-speed air (not-shown). It characterized by streamlined upper lip to prevent flow-separation as will be shown hereafter.

The Main-Section (14), where the FPAs, the T-An and the R-An, as well as additional Peripheral Heated Components (PHC), are located inside a thin, wide and long closed-cavity, isolated from the ambient atmosphere, at "clean-room" conditions.

The purpose of creating the PM-ABR of this invention is to provide an effective and controlled HRM, and in parallel, if achievable, to reduce drag significantly.

The Outlet-Section (16) where the air through the ACD is exhausting out from the ACD, i.e., at its exit at the LE of the PM-ABR (not-shown). Obviously, the temperature the exhaust air is larger from the incoming air temperature. Sector-16 is designed to provide weak interaction between the IFR and the EFR around the tail of the PM-ABR and further downstream, thus drag will not augment.

The Common-Adaptor-Plate (CAP) (18), a common base for a+b+c, which connects the PM-ABR to the airplane fuselage (99, see FIG. 01a).

As the main purpose of the PM-ABR, associated with the present invention, is to host SATCOM antennas, the canopy (101) of the PM-ABR should (at least part of it) made of RF-transparent HQ material (Ka and Ku are common RF bands of SATCOM).

It should be notices also that a "conceptual" 4-section is described in FIG. 01b. This sectional description can optionally be applied in a material manner by design.

The CAP (18) has a Peripheral-Contact-Line (PCL, 98), with the fuselage skin (99). The PCL made of a soft-flexible non-metallic material, thus enables relative movements in case of fuselage deformations during flight or to isolate non-steady AD-induced loads.

Typically, the CAP (18) is connected to the fuselage structure by 4-7 connectors, 1 of them is fixed to the fuselage structure, 1 or more of them allow translation (i.e. Degrees of Freedom, (DoF), and 1 or more of them allow rotation (i.e. another DoF). By that, temporal bilateral forces between the PM-ABR and the platform structures are avoided.

Coordinate-System: The Cartesian Coordinate (x,y,z) that are attached to FIGS. 01a-b is defined in the following way: (+x) is the "downstream direction", (±y) are the lateral horizontal directions, and (+z) is the vertical coordinate, in a "counter-gravity" direction. This coordinate-system is relevant for all the figures of this application, whether it is plotted or not. Furthermore, some figures of this application should be (i.e. in a topological sense) of cylindrical-coordinate (x,r,$\phi$). In some figures one or more of the cylindrical coordinates are plotted and in other figures they are not. To avoid any misunderstanding, and because in practice the PM-ABR is mounted over a substantially cylindrical fuselage, any Cartesian coordinate-system (x,y,z) that is plotted, referred to or mentioned in this application should be regarded as a "simplified coordinate system" of the natural (i.e. in a topological sense) cylindrical coordinate system of the PM-ABR having a cylindrically contoured contact line (98) with (99).

Figure 1C:
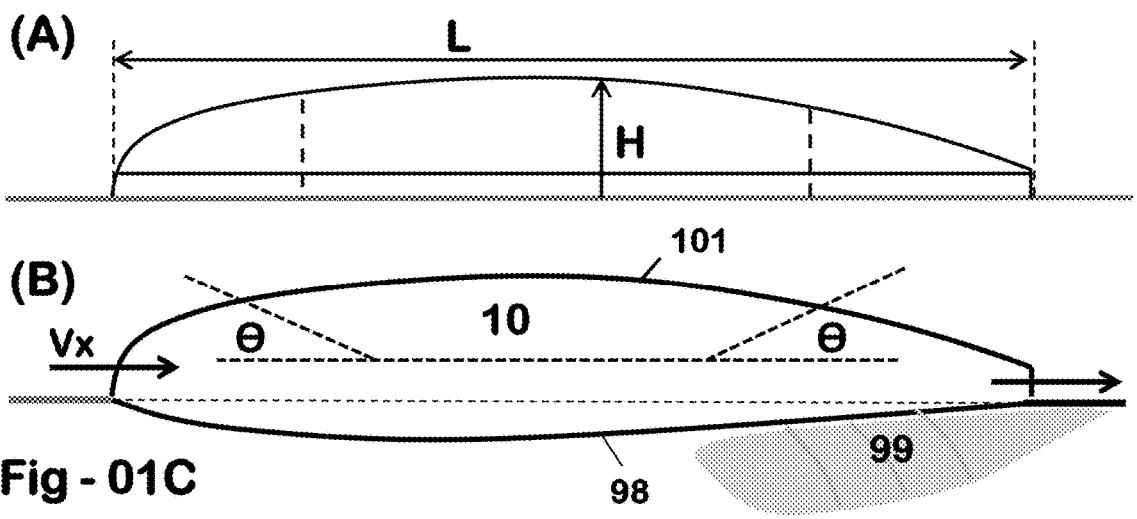

A general side view of the PM-ABR shows in FIG. 01c(a) where the overall length ("L") of the PM-ABR and its overall height ("H") is defined. Please notice that the overall width ("W") of the PM-ABR has already defined in FIG. 01b.

When saying that the PM-ABR is AD-configured to be a slender, AD-smooth, of low-profile, exc., "3D Streamlined Half-Body", it means that both the ratios (H/L) and (H/W) are very small, or in other words that (L) and (W) are larger by an order of magnitude from (H), typically by factor of 10-40. In this situation, the EFR and the IFR around and through the PM-ABR may be consider as a "mostly-2D" flow-regimes, with lateral "edge-effects" close to ±y=±W/2. It should be emphasized that the flow around and inside the PM-ABR is of inherent 3-dimentional character.

Figure 1D:
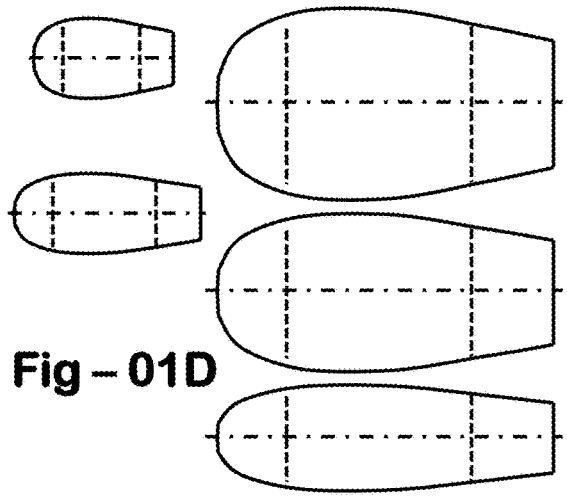

In FIG. 01d relative sizing of the various PM-ABR AD-configurations are shown. The sizing of the PM-ABR is mainly dictated by the capacity (i.e. number of I/Os channels) of the SATCOM system. Without derogating the generality, all these examples are of streamlined AD-configuration, meaning that (L) and (W) are larger by an order of magnitude from (H). Please notice (in FIG. 01e, top-view) that the LE of the PM-ABR may not be roundly curved (a) and the TE of the PM-ABR can also be roundly curved (b).

FIG. 01c(b) illustrates the 3D-configuration of the PM-ABR. It can be denoted by the curved PCL (98), as aircrafts fuselage skin (99) is cylindrically shaped.

The canopy (101) in FIG. 01c(b) is at least partly made of HQ RF-transparent nonmetallic material (Ka and Ku are common RF bands of SATCOM).

In particular, state-of-the-art SATCOM FPAs have a wide-angle Field of View (FoV) in a 2D manner (i.e. a wide cone towards the sky). It means that the transparent canopy should enable communication with satellites at small angle ($\theta$) above the horizon.

Figure 1E:
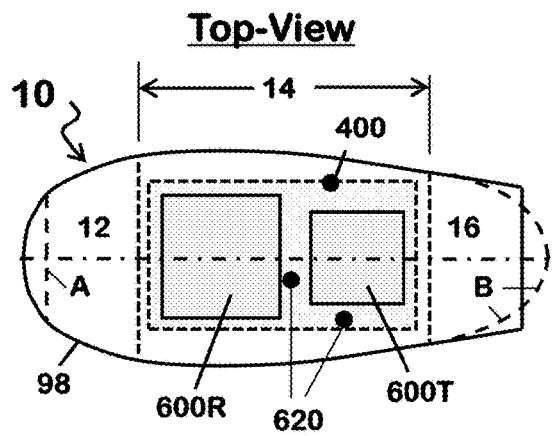

When virtually removing the canopy (101), the SATCOM system is clearly seen in FIG. 01e, where the various heat-emitted FPAs and additional elements are thermally attached to the HSP (400), mainly: (a) the R-An (600R), (b) the T-An (600T) (c) and additional PHS (620). Preferably, the HSP (400) is made of AL, but it can also be made of highly thermal conductive nonmetallic or composite materials).

Common thermal connecting/bonding/contacting techniques are applied to avoid any thermal resistance, (i.e. down-wise −z), even locally (thus avoiding local hot-spots). Accordingly, Heat-Flux (HFL) will efficiently convey the thermal-energy towards the ACD.

Figure 3A:
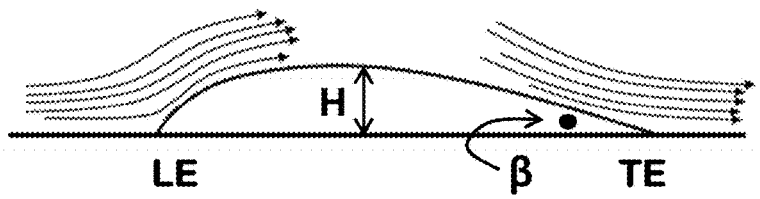
Figure 3A:
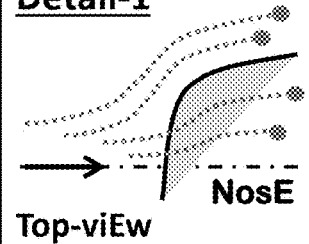
Figure 3B:
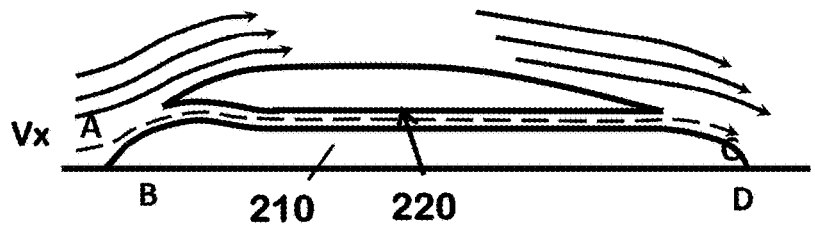
Figure 3B:
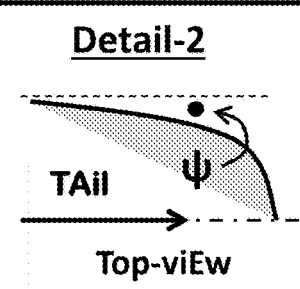
Figure 3B:
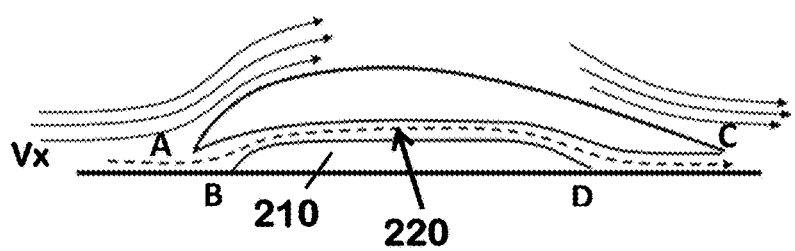
Figure 3C:
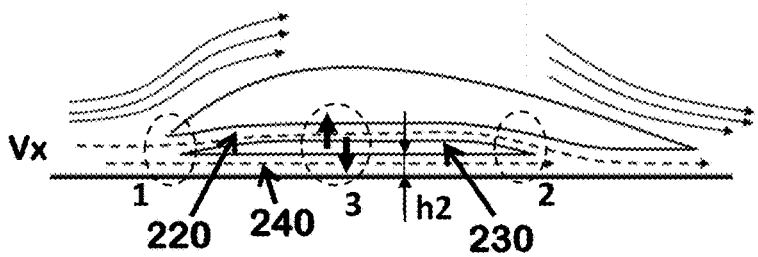
Figure 3C:
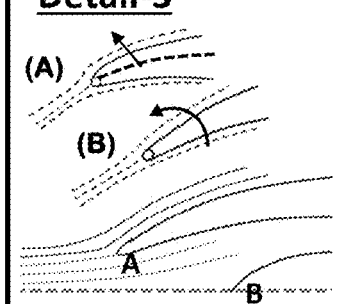

The method of natural heat-evacuation out from the PM-ABR (i.e. downstream, +x), with respect to the Method of the present invention, is illustrated in FIG. 03b and FIG. 03c.

For reference, FIG. 03a describes the flow field around a standard 3D solid streamlined radome, by plotting some "streamlines" around the LE and the TE of the radome. Such radome's AD is vastly understood, and much information is available. Common knowledge about this smooth-skin streamlined configuration has the following 2 important design rules (among other), for minimizing drag (in a 3D manner):

(a) Its height (H) should absolutely be small as possible, to avoid SW appearance, in particular at transonic flight-speed near MCR (see the "sonic-barrier", FIG. 02a).

(b) The angle of decline ($\beta$, side-view) toward the TE of that radome should be limited (i.e. to be less than 12 or even 10 Deg.), to prevent BL separation, thus avoiding development of intensive non-steady "wake" flow downstream of the radome. BL separation is of 3D character, thus also angle ($\psi$, top-view) should be smaller as ($\beta$, see detail-2, FIG. 03b).

In particular, the appearance of SW above the radome may result with:

Interaction between SW and BL thus early flow-separation may occur (drag increase).

SW may periodically/randomly travel upstream (−x) and downstream (+x). Such non steady traveling SW may result with drag increase and imposes loads and vibrations on radome structure.

The stream-lines (SLN) plotted in FIG. 03a explain the "origin" of the Shape-Drag resulted from its geometry/shape/configuration (i.e. part of the overall drag) that disturbs the flow. In a standard solid radome, air-molecules are brutally forced to turn up-wise (+z) and side-wise (±y), i.e. in a 3D manner, see Detail-1, FIG. 03a) thus Shape-Drag increase.

All those AD-understanding is relevant also for the unique two distinguished types of the PM-ABR configurations of the present invention, to be described in FIG. 03b ("Type-1a and 1b") and FIG. 03c ("Type-2").

The unique method associated with the present invention, of using cold air to establish a "natural" HRM is stand strong for both types of the PM-ABR.

It should be emphasized that method of HRM has no moving-parts, and it is well functioned without spending a bit of (electric) energy during fight.

The 2 types of the PM-ABR are shown in FIGS. 03b-c, devoted to the 2 conceptually distinguished versions of the PM-ABR, named hereafterType-1 and Type-2.

PM-ABR-Type-1

The geometry of Inlet, ACD channels and outlet are optimized for reducing the airflow vorticity and minimizing aerodynamic drag.

Both inlet and outlet shape are optimized for matching with the EFR. Several configurations are shown with different manners of controlling the air passing through ACD, and thus, monitoring the Satcom antenna temperature.

In FIG. 03b, the fundamental principles of applying air-breathing for the said PM-ABR Type-1 (in two different shape; 1a and 1b) of the present invention, is schematically described by showing a symmetry cut (y=0) along (x). Generally speaking, the EFR of the PM-ABR Type-1 is of very similar to the EFR of the radome plotted in FIG. 3a, but there is one very significant difference; the internal Air Cooling Duct (ACD, 220) is created along the Type-1 of the PM-ABR, from its LT to TE, thus the "Internal Flow Regime" (IFR) is established where air can pass through the PM-ABR for the purpose of heat-energy evacuation.

The flow-trajectory through the ACD (dashed line, FIG. 03b) is inclined and declined thus passing over ramp (210). Ramp (210) is created due to various system constraints, including installation issues, indicating that system requirements should be fulfilled.

Figure 5A:
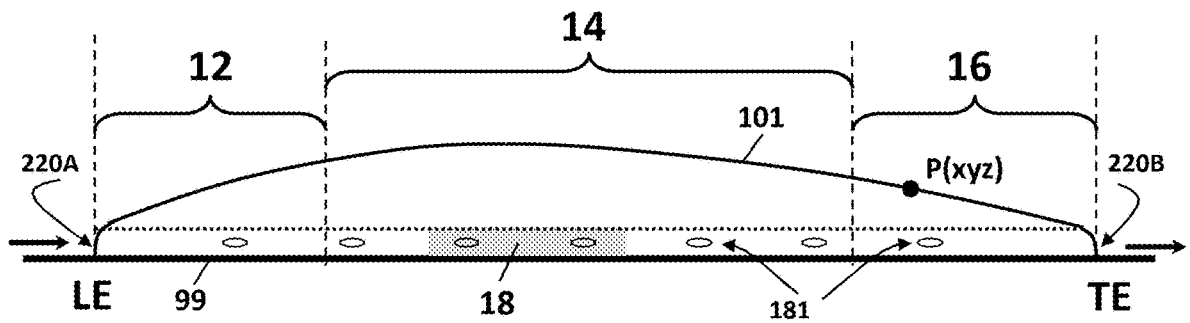
FIGS. 05$a$ to 05$c$ show airflow diagrams illustrating aspects in accordance with some embodiments of the present invention.

FIG. 05a is a side-view of the PM-ABR Type-1, where the inlet (220a) and the outlet (220b) of the ACD are shown. The symbolic expression P (xyz) represents the 3D-streamlined AD-shape of all the version of the PM-ABR.

Please notice to a plurality of holes (181) that are made along (18). Holes (181) come to prevent any pressure-difference between the internal space of the PM-ABR and the outer atmosphere, thus pressure-loads on the PM-ABR embodiment are avoided.

Figure 5B:
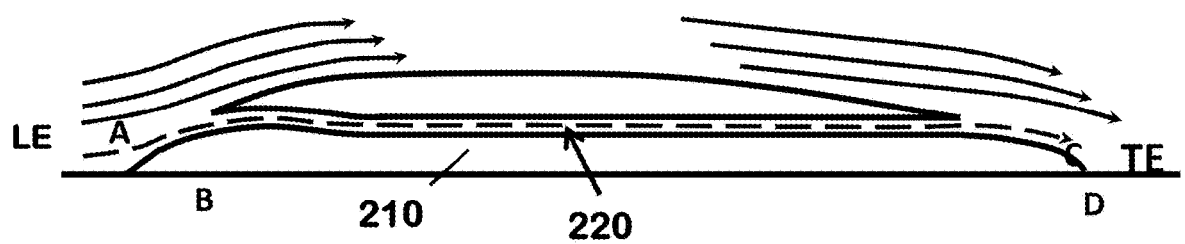
Figure 5B:
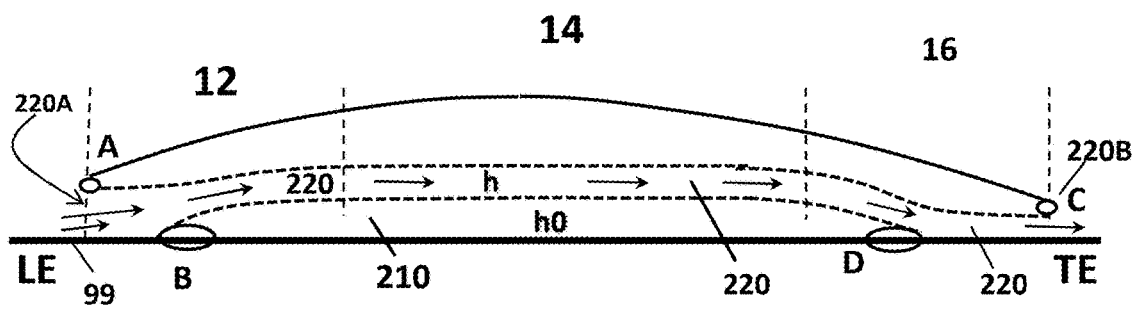

A symmetry cut (y=0) along (x) of the internal air-passage, the said ACD of the PM-ABR Type-1a and Type 1b is shown in FIG. 05b. The inlet (220a) and the outlet (220b) of the ACD are clearly shown, having a height of (h1), where here h1 can be h1(x). The ACD (220) turns up at section-12 and turns back down toward skin (99) at section-16, in order to pass over the CPL (18) having a height of (h1), mostly dictates by system constrains.

Please notice that the upper lips (a) of (220a), the upper lips (c) of (220b), the front edge (b) of (210) and ending edge (d) of (210) are roundly shaped due to AD-considerations and/or system limitation.

Figure 6A:
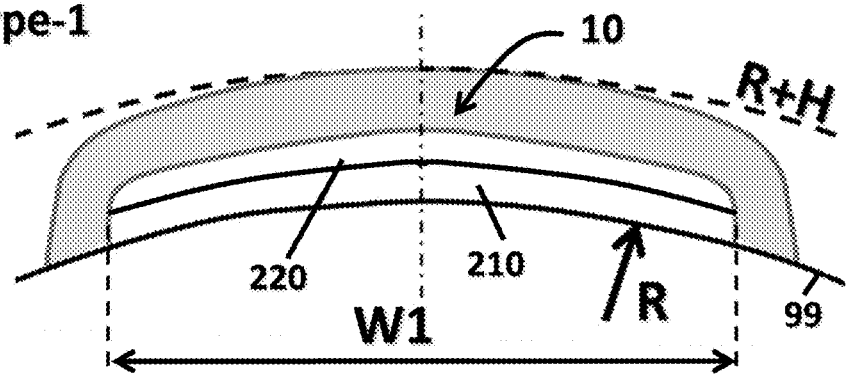
FIGS. 06$a$ to 06$d$ show several inlet shape diagrams illustrating aspects in accordance with some embodiments of the present invention.

FIG. 06a is a front view of the PM-ABR Type-1b. It is clearly understood by this figure that the contact between the PM-ABR and the fuselage skin (99) is not flat, as platforms fuselage is cylindrically shaped. Accordingly, almost all the versions of the PM-ABR (i.e. Type-1 and Type-2), of the present inversion are curved in a cylindrical manner, thus it is "integrated" in an AD-manner over the fuselage. Therefore, It is very important to emphasize that the maximal H(x,y) of PM-ABR AD-configuration should be related the radius (R) of fuselage (99). Notice to the width W1 of the entarence to ACD.

Figure 6B:
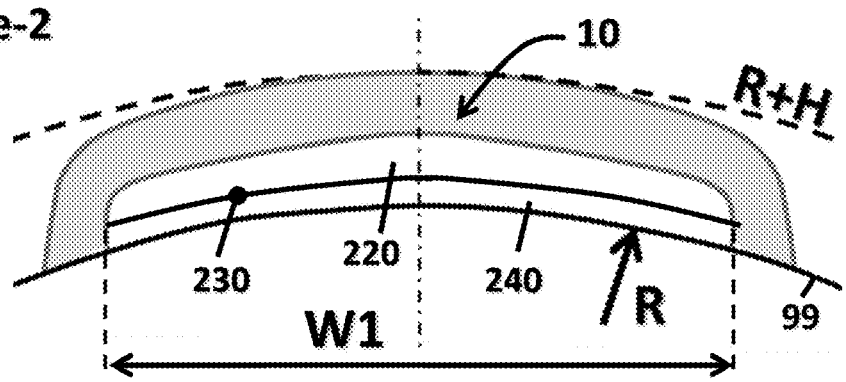
Figure 6C:
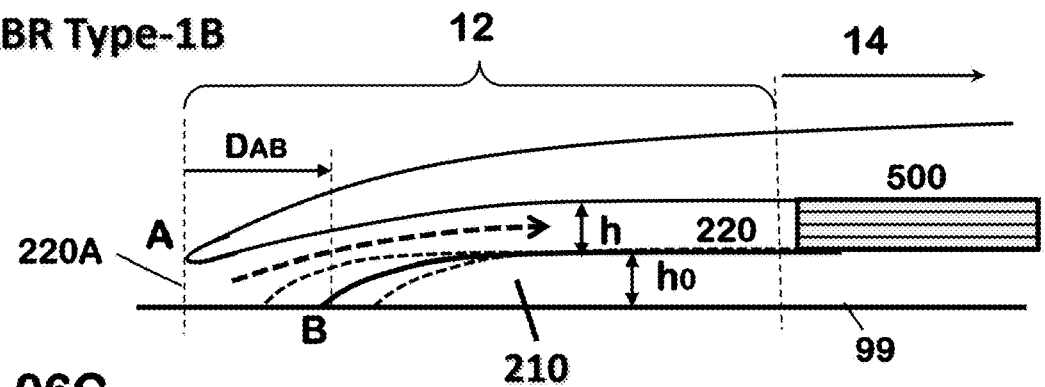

FIG. 06c is a symmetry cut (y=0) along (x) of section-12. It is clearly emphasized in this figure that the inner and the outer surfaces of section-12 that are in contact with the air are AD-shaped. By dashed bold arrow, it is clearly understandable that cold-air that is passing through the ACD is flowing toward the HEX (500) to be discussed hereafter.

This figure also shows that the distance Dab can be specified by AD-design.

Figure 7A:
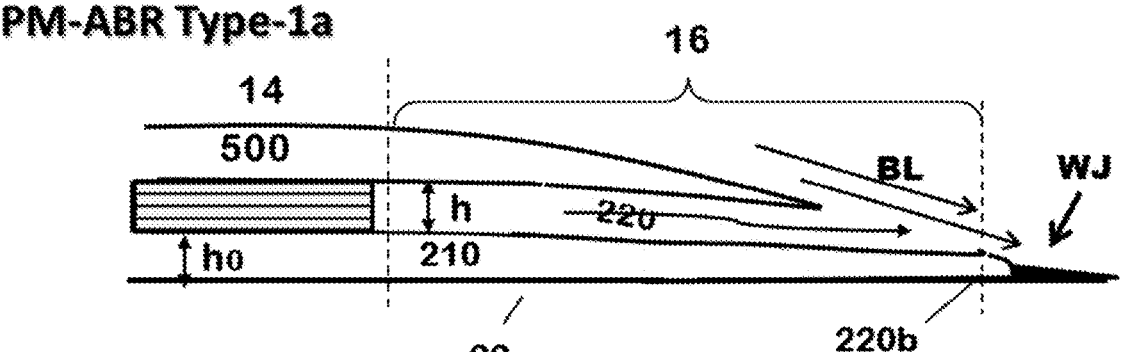
FIGS. 07$a$ to 07$c$ show several outlet shape diagrams illustrating aspects in accordance with some embodiments of the present invention.
Figure 7A:
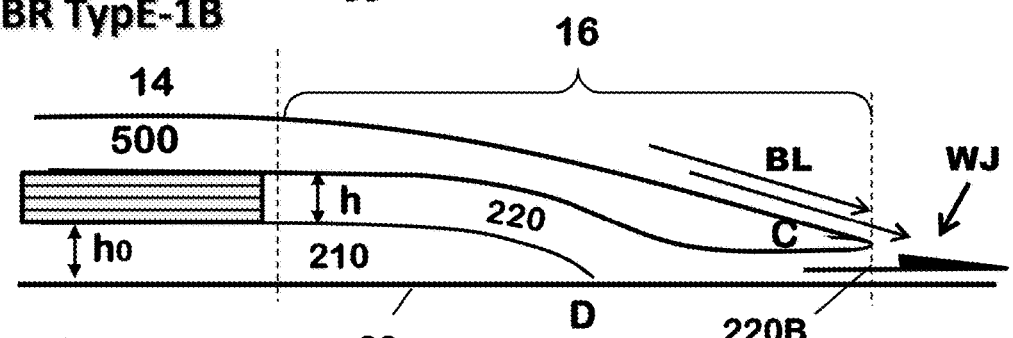

The Design of the Outlet is based on the fact that the outside air accelerates the internal air flow out of the ACD channels. This EFR suction effect reduce the chances for vorticity inside the Outlet but requires consideration of the possible generation of vortices during the mixture with the outside and inside streams. FIG. 07a is a symmetry cut (y=0) along (x) of section-16 for PM-ABR Type 1a and 1b. It is clearly emphasized in this figure that the inner and the outer surfaces of section-16 that are in contact with the air are AD-shaped. The non-symmetric arrow at the ACD exit (220b) represents a "unidirectional wall-jet" (Vx) that is flowing down in parallel to fuselage skin (99), that is immersing from ACD exit (220b). To avoid significant "wake-induced" Drag, it is very impotent to establish by AM-design an ideal, Fluid-Mechanically (FM) perfect as possible "unidirectional wall-jet".

Figure 8A:
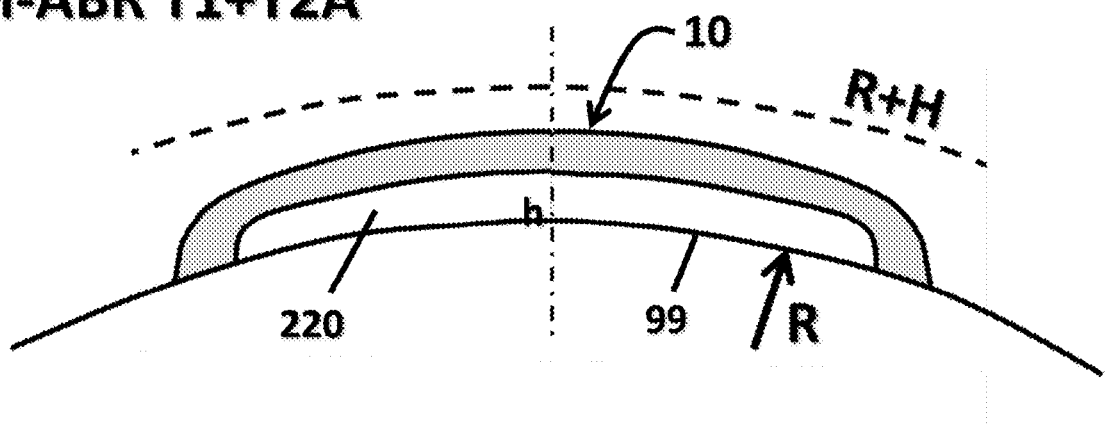
FIGS. 08$a$-08$b$ show Aero-mechanical diagrams illustrating aspects in accordance with some embodiments of the present invention.
Figure 8B:
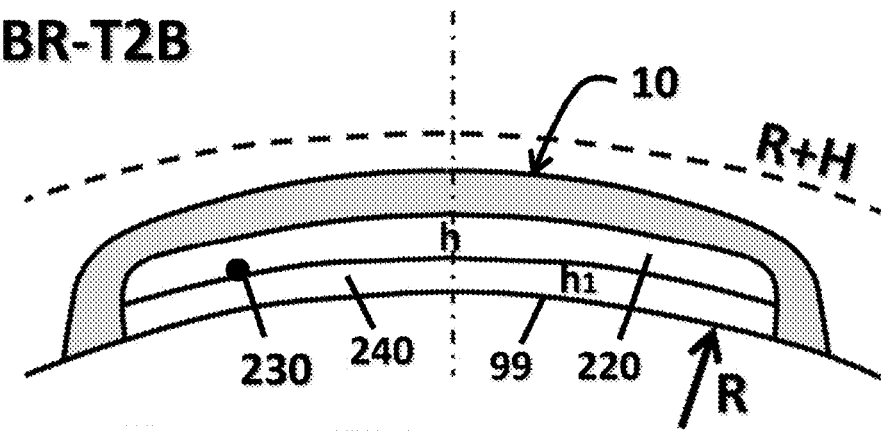

FIG. 08a is an upstream view of the TE of the PM-ABR that is relevant both for Type-1 and Type-2a. This figure will serve to emphasize a critical detail design parameter of the ACD exit (220b) with respect to the unidirectional wall-jet that is immersing (downstream) of (220b); To achieve perfect FM-behavior of the wall-jet, the height Hex(y) exit (220b) should be uniform (i.e. Hex=constant). Hex specified by a magnitude that will equalize the air-velocities Vx of the just immersing wall-get and the BL of the EFR, thus preventing intensive/brutal mixing layer that may increase drag.

FIG. 08a also defines the overall width (W2) of (220b) that may differ from W1 of (220a).

By making use of the relatively cold-air that is passing downstream from the inlet of (220), i.e. at the LE of sector-12 to the outlet of (220), i.e. at the LE of sector-16, the said Natural-HRM is established as will be described hereafter.

The LE of the upper lip of the entrance (220a) to the ACD (210) is physically splits the facing flow (Vx), thus the EFR and the IFR are established. In Detail-3 of FIG. 03c), some representative SLNs are plotted close to ACD entrance. This lip should be aligned with the coming SLN to prevent irregularities in the flow, LE separation and drag increase. Options (a)+(b) are practical "geometrical" practice to avoid such harmful irregularities.

FIGS. 04a-d comes to explain how the HRM serves the PM-ABR heat-cooling needs. The ACD (220) is a substantially rectangular duct (FIG. 04a) with 2 side walls, a bottom Cover Plate (CPL, 599), that made of heat-conductive or not, metallic or non-metallic materials. The top-plate that close ACD is in-fact the down-size (−z) of HSP (400) made of AL. On the upside (+z) of the HSP (400), the various HGCs (600R, 600T, 620) are mounted over (400) top surface (facing the sky), that are thermally bonded to that surface.

Generally speaking, the HRM has a cascade of events (see FIG. 04a):

(a) The HFL generated by the HGC propagates substantially down-wise (−z), and (b) That HFL transfers thermal-energy through the HSP towards (−z) the ACD, and (c) When cold air at temperature T1 is flowing downstream (+x) through the ACD that us substantially below the HGCs that are bounded to the top-side on the HSP, and (d) When 1 or more Heat-Exchangers (500, HEX) (been in fact one of many of-the-shelf Heat-Sinks (HSK, see FIG. 04b) is integrated (i.e. fluidically connected) inside the ACD, thus an effective, short-distance (few mm gap!) HRM is established between the HGCs to the cold-air flowing downstream (+x) to the exit of the ADC, and (e) If the air is exhausting from ACD to the atmosphere at T2>T1, meaning that the system had successfully transferred the heat generated by the Satcom antenna into the surrounding air outside the PM-ABR.

The natural Heat-Removal-Mechanism (HRM) associated with the PM-ABR of the present invention is established during flight, from takeoff to landing (in case the platform is an aerial vehicle).

Figure 4A:
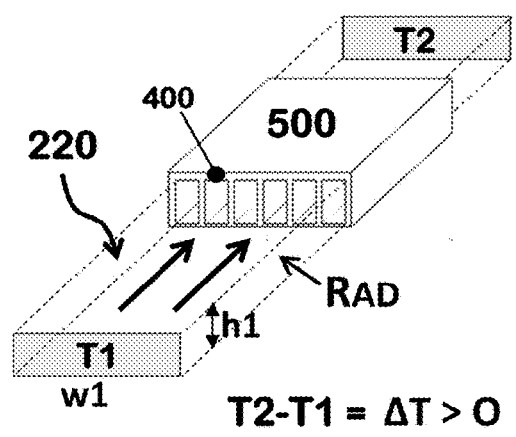
Figure 4B:
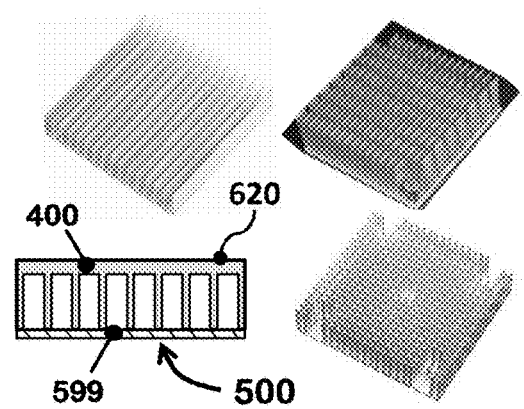
Figure 4C:
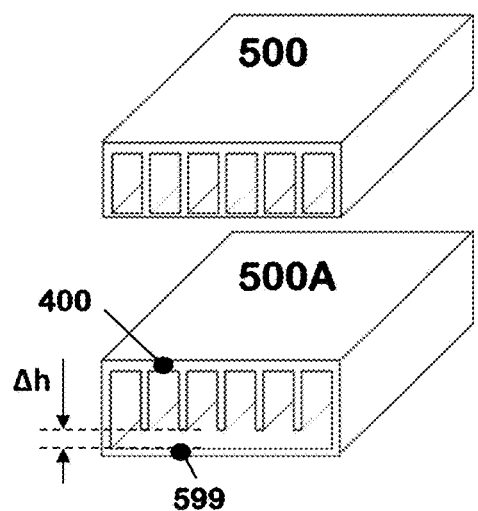
Figure 4D:
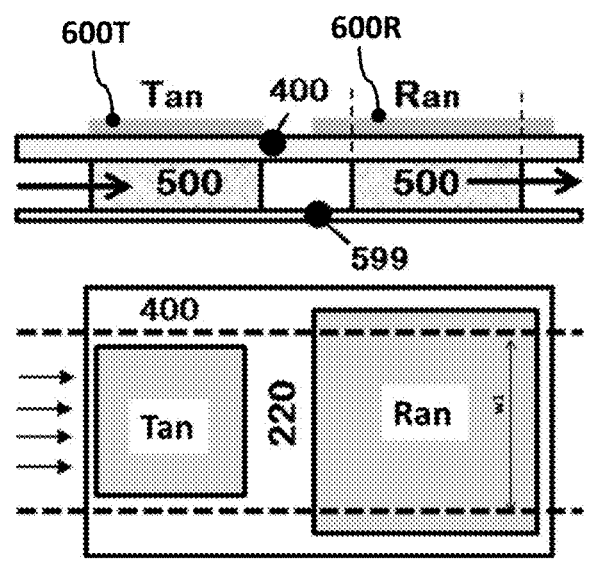

Some more design details regarding the HRM are given in FIG. 04d, where a side-view-cut and a top-view of section-14 are plotted. In the side-view-cut, the FPAs (Tan and Ran) that are bonded to the HSP (400) are plotted where HEXs (500) are placed just below that FPAs. In the top view the ACD (220) below HSP (400) is plotted in a dash-line, having a width (w1). Width (w1) is intentionally plotted as smaller than Ran width and larger than Tan width. It is plotted so, to emphasize that HFL is a "vector", and the HFL can transfer thermal-energy side-wise (i.e. in x,y directions), inside the HSP (400).

The "one or more" HEXs inside the ACD have AD-resistance (Rad), thus Mass-Flow-Rate (MFR) through the ACD is limited while stagnation pressure drop ($\Delta P$) is increased.

The sizing of the PM-ABR (see FIG. 01d), affects the detailed design of the ACD, such as the sizing of the HEXs inside the ACD, and of course, depends on HFL intensity.

With respect to Free-Flow (FF) through the ACD (supposing no HEXs inside it), "MFR1" would have been much more intensive than the reduced "MFR" through the ACD with the presence of HEXs inside. It affects the overall PM-ABR Drag in the following way: In the "FF-ACD", a large portion of air molecules travel through the ACD, thus they are not forced to turn up/side-wise around the PM-ABR (i.e. in a 3D-manner). The enforcement on air-molecules to turn is the origin of the Shape-Drag of AD-configurations. Accordingly, when the ACD is "partly blocked" by HEXs inside it, MFR (<MfR1) is significantly reduced, but still, Drag-Reduction is significant when comparing to a solid radome (FIG. 03a).

Another "way" to describe this drag reduction is to see it as a virtual TRUST (−x) that reduced the overall drag (+x), when comparing to the solid radome shown in FIG. 03a.

More AD-design issues have to be mentioned regarding PM-ABR Type-1: It harvests the weak sub-layer of the facing turbulent BL (FIG. 02b). In such occurrence:

Air momentum though the ACD is less intensive thus heat-removal efficiency of the ACD is slightly reduced.

Unsteadiness may develop at the entrance to the ACD, including possible developing of blocking and traveling (shaded) vortices inside ACD, hence the Rad is dynamically increased, resulted in drag increase of the PM-ABR AD-configuration.

Introduction of multiple vertical dividers inside the ACD, from the inlet, through the HEX to the outlet, helps achieving more uniform air flow distribution at the cooling regions of the ACD channels. FIG. 3j shows different configuration, with vertical dividers. Central inlet/outlet and split inlet/outlet configurations are shown, with multi channels ACD divisions under the Satcom Antenna, resulting in streamline flow within the channels with adequate HRM.

The inventors have found out that sufficient cooling can be achieved when cooling channels are partially occupying the area of the heat generating areas. This fact allows for additional degrees of freedom for the structural design aspects of the HEX.

A well-functioning HRM with respect to the method of the present invention mainly should provide (a) highly uniform temperature over each of the FPAs (b) to keep the specified "comfortable-temperature" range (Tmin-Tmax) at all flight conditions.

The PM-ABR of all versions, aimed to provide such a well-functioning HRM, both in a passive (i.e. by design rules) manner, and by implementing active options during flight.

PM-ABR-Type-2

In FIG. 03c, the fundamental principles of applying Air-Breathing for the said PM-ABR Type-2 of the present invention, is schematically described. This Figure is side view cut at symmetry line (y=0) along (x). In most details Type-2 is similar to Type-1 (FIG. 3b), but instead of the rump (210) below (220) additional air-passage is created: the ByPass Duct (BPD, 240). A Splitting Plate (SPL, 230) splits the IFR air-flow to the upper and lower ducts. The BPD (240) height (h1) can be larger/small/equal to (h1).

As the IFR at the PM-ABR Type-2 is divided into 2 parallel air-channels, New AD-design options may create an advanced PM-ABR having superior properties, in particular of enhanced HRM performances during flight by implementing control-options.

With respect to Type-1, Type-2 manifests the following AD-advantages:

By splitting the flow, the weak sub-layer of the BL is conveyed downstream through (240), thus more intensive air is collected at the entrance to (220)

As higher is the entrance to the ACD (above fuselage), more MFR is collected (see BL velocity profile in FIG. 02b). Accordingly, the capturing-area at entrance (220) the ACD can be smaller, thus Shape-drag should reduce.

Without "obstacle" inside (240), the AD-impedance of the BPD, is significantly smaller (by order of magnitude for example), from the AD impedance of the ACD. Accordingly (see detail-1, FIG. 03b), significantly more molecules of air will travel through the PM-ABR Type-2 (most of the molecules though the BPD).

Accordingly, it is expected that the drag of PM-ABR Type-2 will be smaller than drag of PM-ABR Type-1.

Having two ducts open new options for controlling ACD MFR (for controlling the FPAs temperature at section 14). Several predesigned options to control the ACD MFR are opened when the BPD is existing below it (see, 1-3 in FIG. 03c):

It is an option to manipulate MFR220/MFR240 by presetting the LE of the SPL (230) up or down, or to activate it up or down during flight.

Similar practice can be applied at the TE of the SPL (230). In both (1) and (2), electromagnetic actuators can be used, or alternatively to apply "shape-morphing" state-of-the-art aviation technologies.

MFR can be manipulated by air-exchange between (220) and (240) in a self-adaptive (passive) manner at selected locations (+x) along (230), in this case also the downstream temperature of the air flowing inside the ACD may manipulate.

Figure 3D:

FIG. 03d illustrates a thin version of the PM-ABR Type-2, where the LE of the upper lip of ACD (220) and the LE of the SPL (230) are facing the flow in a substantially horizontal manner. In this version the PM-ABR AD-configuration interrupts the EFR in minimal manner, i.e. air much less air-molecules turn up/side-wise (see Detail-1, FIG. 03*a*), in comparison with the other PM-ABR versions shown in FIG. 03.

Figure 5C:
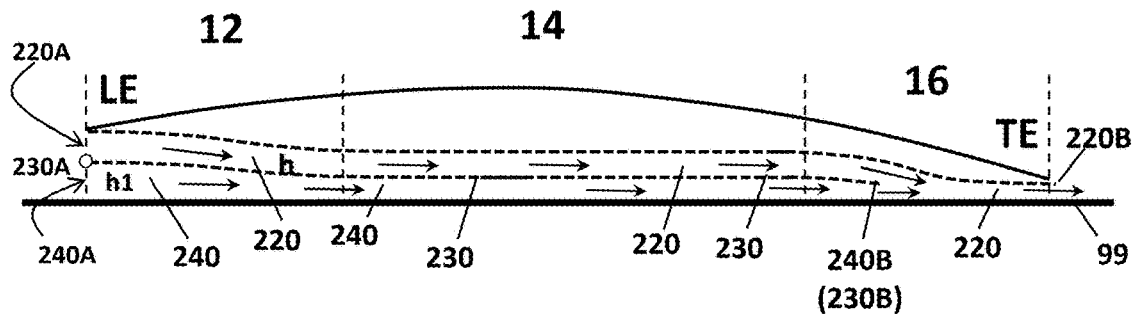

A symmetry cut (y=0) along (x) of the PM-ABR Type-2 is shown in FIG. 05*c*. Many details are similar to the PM-ABR Type-1 shown in FIG. 05*b*, but in addition to the ACD (220) another flow passage is created from the LE to the TE of the PM-ABR, namely the BPD (240) that is created below the ACD (220), having height of (h1), thus a thin SPL (230) in between these 2 ducts exists. In the version of the PM-ABR Type-2 shown in this figure, the entrance (240*a*) to the BPD is vertically aligned with the entrance (220*a*) of the ACD. But the exit (240*b*) of the BPD is created much upstream from the TE of the PM-ABR. Accordingly, the two separate flows (inside the ACD and the BPD) are merged in an internal location (i.e. the BPD merge with the ACD). Accordingly, the merged flow exhausts at the exit (220*b*) of the ACD (i.e. at the TE of that version of the PM-ABR Type-2.

FIG. 06*b* is a front-view of the PM-ABR Type-2., which is very similar the PM-ABR Type-1 shown in FIG. 06*a*. However, instead of the Rump (210) the BPD (240) replace it. The LE of the SPL (230) is also plotted. In this case, the weak sub-layer of the BL is streaming downstream through the lower BPD.

Figure 6D:
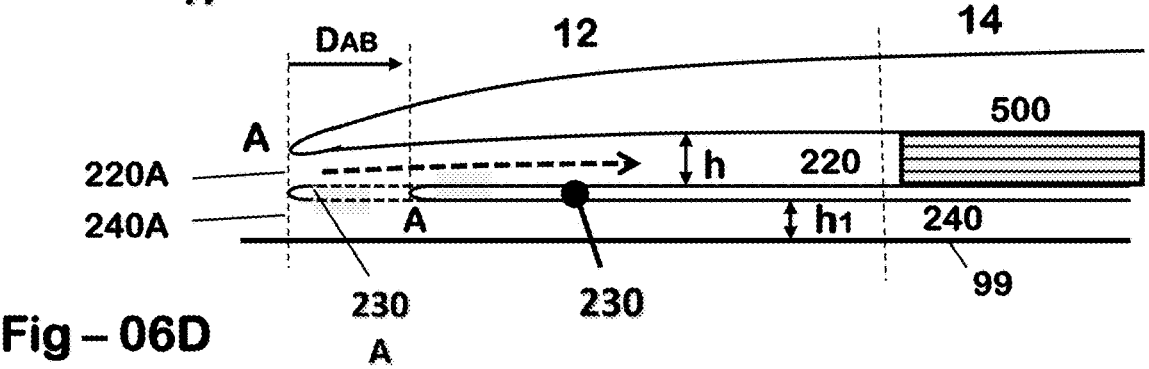

FIG. 06*d* is a symmetry cut (y=0) along (x) of section-12. It is clearly emphasized in this figure that the inner and the outer surfaces of section-12 of the PM-ABR Type-2. In this version, the LE lip (b) of the SLP is vertically aligned with the LE of the upper lip (a) of the ACD entrance (220*a*). However, lip (b) can be located at Dab distance (+x) after the upper lip (a) of the ACD.

Figure 7B:
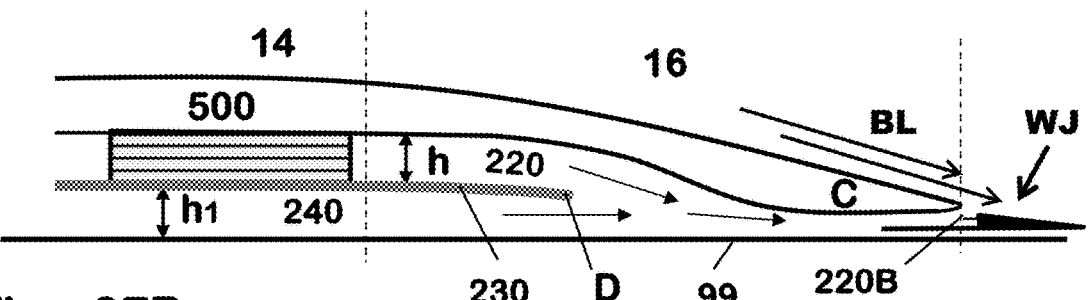

FIG. 07*b* is a symmetry cut (y=0) along (x) of section-16 of the PM-ABR Type-2*a* as the flows through are ACD and the BPD are internally merged as explained with respect to FIG. 05*c*, and share one exit at the PM-ABR TE, the details of about interaction between the IFR and the EFR are already described with respect to the PM-ABR-Type-1 (FIG. 07*a*).

Figure 7C:
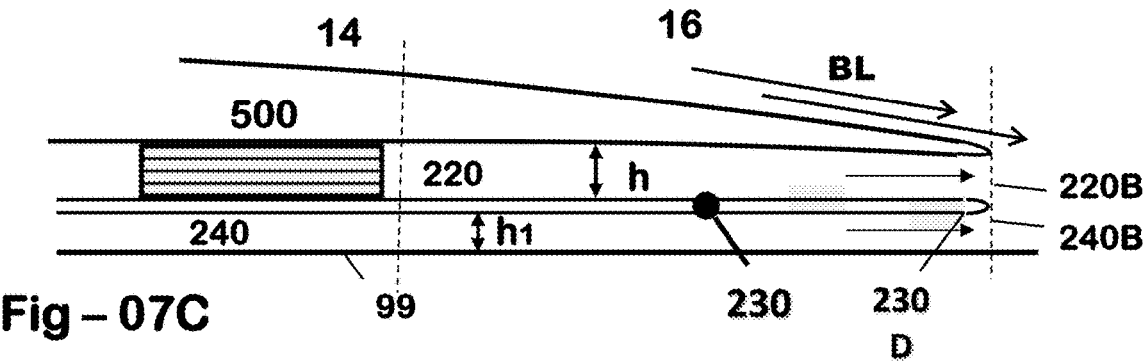

FIG. 07*c* is a symmetry cut (y=0) along (x) of section-16 of the PM-ABR Type-2*b*, were both ducts ended at the TE of that PM-ABR. Accordingly, three flow-streams coming from three different sources should be aerodynamically adjusted to prevent violent downstream interaction that may increase drag.

FIG. 08*a* is an upstream view of the TE of the PM-ABR Type-2*b* that is described in FIG. 07*c*. As explained with respect to FIG. 08*a*, here there are 2 critical parameters of design, namely h and h1, that should be constant (laterally speaking).

Figure 3E:
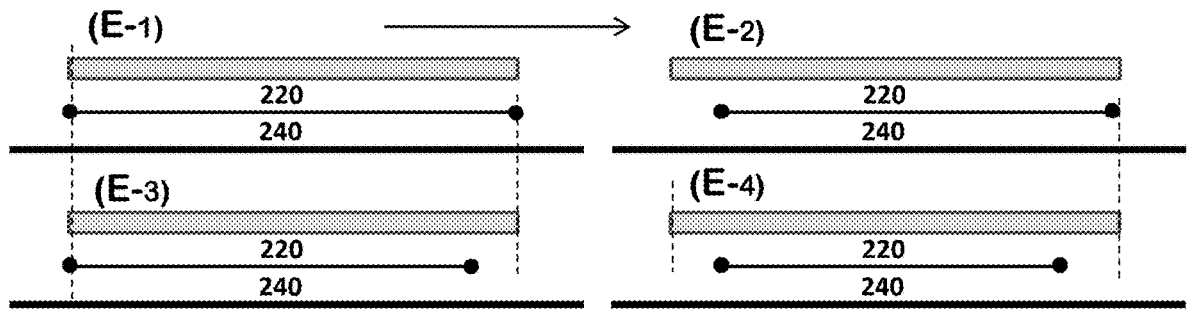

FIG. 03*e* gives 4 alternatives to spit the IFR along the PM-ABR Type-2, regarding to the LE and TE locations of the SPL along Type-2: ([[e1] E-1) LE & TE of SPL aligned with ACD inlet & outlet, and relative to it, ([[e2] E-2) LE of SPL moves downstream (+x). ([[e3] E-3) TE of SPL moves upstream (−x). (E-4) LE of SPL moves downstream (+x) and TE of SPL moves upstream (−x).

Figure 3F:
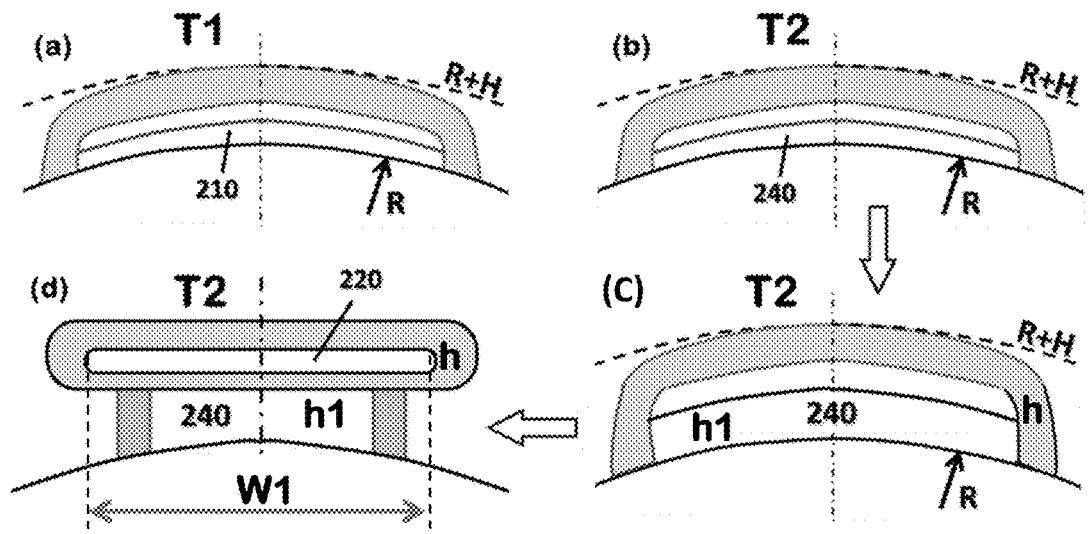
Figure 3J:
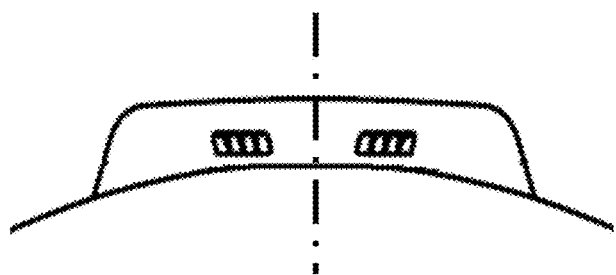
Figure 3J:
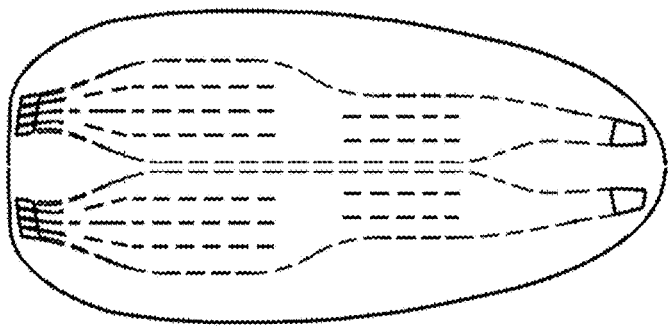
Figure 3J:
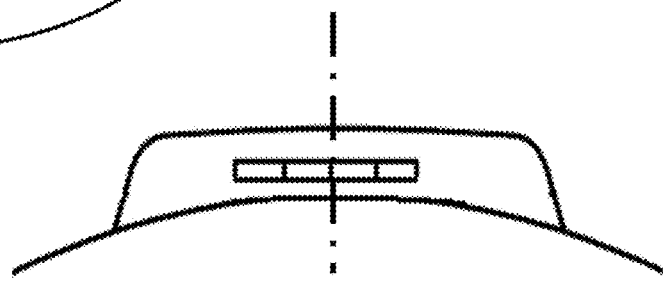
Figure 3J:
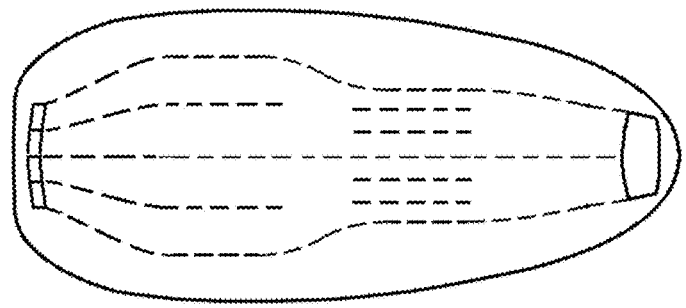

FIG. 03*f* shows a front-view of some principal versions of the PM-ABR:
A typical front-view of PM-ABR Type-1, where the Rump (210) is seen below the ACD.
A typical front-view of PM-ABR Type-2, where the BPD is seen below the ACD.
A similar version of (b) but the height (h1) of the BPD is significantly larger.
A flat version of (c), when comparing to the cylindrical shape of the fuselage (99).

Comments
Although the overall height (H) of the PM-ABR shown in versions (c) and (d) may be larger than (H) of versions (a) and (b), it may not affect much on drag as BPD is becoming much wider. Moreover, if due to any system consideration, H should be increased, by adopting versions (c) or (d), drag should be reduced relatively.

When large portion of (H) is contributed by (h1), in-fact, AD-speaking, the drag is decoupled from (H) in a sense that drag is not directly (in a linear manner) related to "physical" (H). In versions (c) and (d), where the BPD is significantly wider, a modified "effective" (Hef), being significantly smaller than (H) is a better estimation of this critical parameter that affect shape-drag, a modified parameter also may affect the appearance of SW thus waves-drag may increase.

Versions (a-c) are radially integrated with the fuselage in a contoured 3D-manner, imposing some design difficulties. Version (d) is different: as BPD is becoming wider (h1), there is an option to design a substantially FLAT radome that carried and mounted above airplanes fuselage by side supports. By Flattening the PM-ABR (see d), system design is expected to be easier, and production will be less expensive.

Please notice that also that the ratios W1/h and W1/h1 are of order of 10'Th, typically 20-50. Accordingly, from AD-point of view, also the ACD and the BPD as well as the IFR of all PM-ABR versions of the present invention (associated with wide-and-flat FPAs), from LE to TE, may all be defined as "mostly 2D" as emphasized with respect to the overall PM-ABR ratios: H/L and H/W.

Regarding the various AD-configurations of the PM-ABR of the present invention, a conceptual classification to Type-1 and Type-2 versions has been made.

FIGS. 03*g* presents in a logical manner 3 main version of Type-1, having only one duct (i.e. ACD) through the PM-ABR:
(g1) Type-1 having the ACD above Rump (210).
(g2) Type-1 that is similar to (g1), but the cooling-fins of the HEX are detached from Rump(210) surface, (see FIG. 04*b*). Hence, an internal bypass is created inside ACD, thus the ACD AD-Resistance ACD may significantly reduce, and cooling performances should be improved.
(g3) is an extreme version of (g2) where the lower "boundary" of the ACD is skin (99)

FIG. 03*h* presents in a logical manner 2 main version of Type-2 having 2 duct (i.e. the ACD and the BPD: having only one duct (i.e. ACD 220) that are essentially different:
(3*h*1) Type-T2 with a small Rump (210) below BPD (240)
([h2]] 3*h*2) Type-T2, where the bottom-side of the BPD (240) is the skin (99) of air-plan fuselage.

FIG. 03*i* describes some versions of the PCL (98) between the PM-ABR CAP (18).

By way of a non-limiting example, a generalized definition of the ACD and the BPC is provided below:
Sector-12 (Inlet-Nozzle)—from the LE of the PM-ABR to the entrance to Sector-14
Let's define Sector-12 inlet area $A0=w0 \cdot h0$ (i.e. at x=0), in case only the ACD exists along the PM-ABR:
In general, the area along Sector-12 is $A1=A1(x)$
More specifically, $A1(x)=h1(x) \cdot w1(x)$, meaning for example that $A1(x)$ can be a convergent conduit, were $h1(x)$ or $w1(x)$ or $w1(x) \cdot h1(x)$ is becoming smaller with x.
In some cases A1=constant along Sector-12
The horizontal centerline of A1 at y=0, x=0 (at the LE of PM-ABR), can be selected at any $\Delta z$ (i.e. $\pm \Delta z$), relative to a selected z=Z of similar horizontal centerline at Sector-14 entrance. Accordingly, Both $A1(x)$ and the horizontal centerline is changing with z along x in an ADcally-continues and smooth manner between sectors.

In a similar way, more complex definitions (i.e. by using f=f(x,z) functions), can be define in versions of the PM-ABR where both the ACD and the BPD exist.

However, the width w(x) of the BPD may be a different from w(x) of the ACD.

Sector-16 (Outlet)—from the exit of Sector-14 to the TE of the PM-ABR

Let's define Sector-14 exit area A2=w2·h2 (i.e. at TL of the PM-ABR), in case only the ACD exists along the PM-ABR In general, the area along Sector-16 is $A2=A2(x)$ More specifically, $A2(x)=h2(x) \cdot w2(x)$, meaning for example that $A2(x)$ can be a divergent conduit, were only $w2(x)$ is becoming wider with x.

In some cases A2=constant along Sector-16

The horizontal centerline of A2 at y=0 and the TE of the PM-ABR, can be selected at any $\Delta z$ (i.e. $\pm \Delta z$), relative to an arbitrary z=Z of such horizontal centerline at Sector-14 exit. Accordingly, this horizontal centerline is changing with z along x in an AD-smooth manner. Preferable examples: (1) $\Delta z=0$ (2) if z=Z at exit of Sector-14, than $\Delta z=-Z$.

Accordingly, Both $A2(x)$ and the horizontal centerline is changing with z along x in an ADcally-continues and smooth manner between sectors.

Embodiments

According to some embodiments of the present invention, there is provided a streamlined configured PM-ABR mounted on over the fuselage of an aircraft, carries one or more heat-emitted SATCOM-FPAs inside a compact, isolated, clean and of controlled conditions closed housing.

According to some embodiments of the present invention, two versions of the PM-ABR are alternatively may implemented: PM-ABR Type-1 (1a and 1b) having the ACD and PM-ABR Type-2 having the ACD and the BPD below it.

According to some embodiments of the present invention, the Type-1 and Type-2 versions of the PM-ABR are creating for same 2 main purposes:

To create a method for providing an optimized "natural" passive mechanism of evacuating thermal-energy that generates by the FPA during flight, and To establish a method of reducing the drag of the AB-ABR during flight.

According to some embodiments of the present invention, the AB-ABR Type-1 comprising:
  An AD-shaped skin;
  A RF-transparent canopy;
  A HSP made of heat-conductive materials where the FPAs are thermally connected to the upper side of this plate;
  An internal, substantially rectangular ACD that is created from the LE to the TE of the AB-ABR. The whereby when the air-craft is flying, cold-air is harvesting by the inlet of the ACD, flowing through it and exhausts at its exit;
  A substantially flat and thin HSP, being the top cover plate of the ACD, where a plurality of heat emitted components including one or more FPAs are thermally connected over it and spread over its substantially wide top surface;
  One or more HSK are installed inside the ACD, and thermally connected to the bottom side of the HSP, or alternatively integrated with the HSP, locating substantially below the heat-emitted elements,
  Whereby, during flight, when cold-air is passing along the ACD and though the HSKs inside it, and when the heat-emitted elements are operated and generate heat The cold air absorbs the thermal-energy, heated and evacuates the heated air downstream of the AB-ABR, and When air is passing through the ADC form the LE to the TE of the AB-ABR the drag of the AB-ABR is significantly reduced.

According to some embodiments of the present invention, the AB-ABR Type-2 comprising;
  All elements that already listed above, and in addition:
  An additional BPD below it
  A SPL with MFR control between the ACD and the BPD having various MFR control means, passive or active, for controlling the MFR through the ACD and/or the MFR through the BPD
  whereby by using this control means for manipulating the MFR through the ADC.

The aforementioned PB-ABR may be used for a method of optimal temperature control of the FPAs is established, and a method of maximize PM-ABR drag-reduction is established in a decoupled manner with respect to thermal management control optimization.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting of" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A platform-mounted radome comprising:
a low-profile aerodynamic canopy made of a radio frequency (RF) transparent material, wherein the canopy has a leading edge and a trailing edge and is suitable to accommodate a flat panel satellite communication (SATCOM) antenna;
an air-cooling duct connecting an inlet at the leading edge of the canopy and an outlet at the trailing edge of the canopy, wherein the air-cooling duct is designed to transfer cool air collected by the inlet across the canopy when a platform of the platform-mounted radome is moving, and further comprising a bypass duct;
a heat exchanger thermally coupled to heat-generating elements of the SATCOM antenna and the air-cooling duct;
one or more heat sinks located within the air-cooling duct and thermally coupled thereto; and
a splitting surface located between the air-cooling duct and the bypass duct, and splitting the air-cooling duct from the bypass duct.

2. The platform-mounted radome according to claim 1, wherein said heat exchanger thermally coupled to heat-generating elements of the SATCOM antenna and the air-cooling duct captures cool air through an optimized inlet with single, dual, or multi air channels, passing underneath the SATCOM antenna, and exhausting radome heat via a streamlined single channel or dual channels outlet.

3. The platform-mounted radome according to claim 1, wherein said heat exchanger comprises a heat spreader plate made of heat-conductive materials where the heat-generating elements of the SATCOM antenna are thermally connected to an upper side of the heat spreader plate.

4. The platform-mounted radome according to claim 3, wherein said heat spreader plate forms an upper side of the air-cooling duct.

5. The platform-mounted radome according to claim 4, wherein said one or more heat sinks located within the air-cooling duct are thermally coupled to a lower side of the heat spreader plate, creating an optimized heat exchanger.

6. The platform-mounted radome according to claim 1, wherein the splitting surface splits the air-cooling duct and the bypass duct to an upper and a lower duct.

7. The platform-mounted radome according to claim 6, wherein a ratio between a height of the upper duct and a height of the lower duct is selected to control a temperature of the heat-generating elements of the flat panel SATCOM antenna.

8. The platform-mounted radome according to claim 1, wherein the splitting surface is for controlling a mass air flow rate through the air-cooling duct.

9. The platform-mounted radome according to claim 1, wherein the platform of the platform-mounted radome is a non-stationary platform comprising one of: a ground vehicle, an aerial vehicle, and a marine vehicle.

10. The platform-mounted radome according to claim 1, wherein the bypass duct creates an internal air-passage within the air-cooling duct, thereby reducing aerodynamic drag and increasing cooling performance of the air-cooling duct of the SATCOM antenna.

* * * * *